United States Patent Office 3,828,022
Patented Aug. 6, 1974

3,828,022
10,11-ANHYDROERYTHROMYCINS
John Soloman Tadanier, Chicago, and Jerry Roy Martin, Waukegan, Ill., assignors to Abbott Laboratories, North Chicago, Ill.
No Drawing. Filed June 15, 1972, Ser. No. 263,051
Int. Cl. C07c 129/18
U.S. Cl. 260—210 E        6 Claims

ABSTRACT OF THE DISCLOSURE

Covers 10,11-anhydroerythromycins which are useful as antibiotics.

DESCRIPTION OF THE INVENTION

This invention relates to novel 10,11-anhydroerythromycins that possess antibiotic activity. Said erythromycins are also useful as intermediates in preparing other active erythromycin compounds.

Erythromycin is produced in two forms denoted A and B by cultivating a strain of *Streptomyces erythreus* in a suitable nutrient medium as is taught in U.S. 2,653,899, Bunch et al. The structure of erythromycin is represented by the following formula:

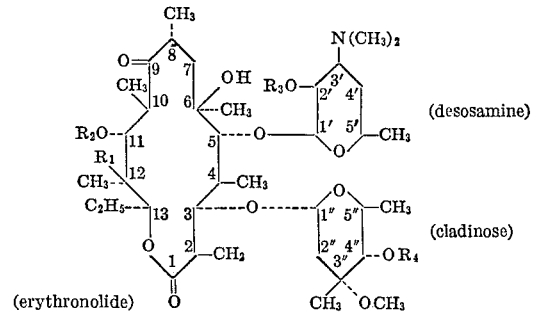

In this formula, when $R_2$, $R_3$ and $R_4$ represent hydrogen and $R_1$ represents hydroxyl, the structure illustrated is erythromycin A. When $R_1$ is, however, also hydrogen, the structure of erythromycin B is illustrated. The term "erythromycin" when used herein without modification is meant to embrace both forms, that is erythromycin A and erythromycin B.

Erythromycin, as will be noted from the formula, comprises three cyclic fragments. These fragments are referred to respectively as cladinose, desosamine and erythronolide. The portions on the cladinose ring are indicated by double primed numbers; the positions on the desosamine ring by single primed numbers; while positions on the erythronolide ring are indicated by unprimed numbers.

The compounds of the invention may be prepared in two general procedures. In the first procedure a 11-O-methanesulfonyl-2'-O-acetyl-4"-O-formylerythromycin A or B or enol ethers thereof, prepared in accordance with the procedure set out in copending, commonly assigned application, bearing Ser. No. 263,087, filed as of even date are treated with a strong, non-nucleophilic base present in an inert solvent to form the corresponding 10,11-anhydro derivative. The base in this step may be chosen from a variety of basic substances. However, preferred bases are 1,5-diazabicyclo[5.4.0]undecene-5 (abbreviated as DBU) and 1,5-diazabicyclo[4.3.0]nonene-5 (DBN). Another suitable base is sodium carbonate. When DBU or DBN is used it is preferred that an inert solvent such as xylene, methylene chloride or another inert halo hydrocarbon, toluene or benzene be used. The reaction may be run between room temperature and reflux temperature of the solvent for a period of time ranging from 15 minutes to about 6 hours. When sodium carbonate is used, generally in an alcoholic solvent, the reaction is run at room temperature for a period of time ranging from about 24 hours to about 48 hours.

In the second step the 2'-acetyl and 4" formyl groups of the 10,11-anhydro derivatives is removed by reaction with methanol or methanol containing a carbonate or bicarbonate material.

In the other primary reaction sequence 11-O-methanesulfonyl erythromycin which does not contain the 2'-acetyl-4"-formyl blocking groups is reacted with a base described above to directly produce the 10,11-anhydro derivative. The 10,11-anhydroerythromycin are readily converted to the corresponding enol ether by the method set out by Kurath et al., Experienta. *27,* 362 (1971).

The following examples illustrate preparation of the compounds of the invention.

EXAMPLE 1

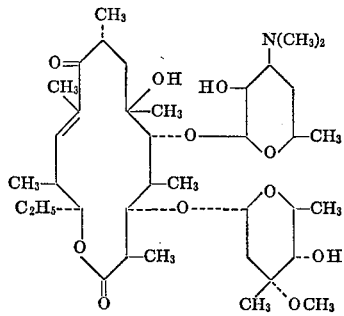

10,11-Anhydroerythromycin B

A solution prepared from 7.5 g. of 11-O-methanesulfonyl-2'-O-acetyl-4"-O-formylerythromycin B, 3.4 g. of 1,5-diazabicyclo[5.4.0]undecene-5, and 50 ml. of benzene was heated under reflux on a steam bath for 0.5 hour. The reaction mixture was cooled to room temperature. Benzene (50 ml.) and water (50 ml.) were added, and the resulting mixture was stirred at room temperature for 1 hour, and then shaken with a mixture of 400 ml. of benzene and 300 ml. of 5% $NaHCO_3$. The aqueous phase was separated and extracted with 400 ml. of benzene. The benzene solutions were washed in series with five 300-ml. portions of water, combined, and dried over anhydrous magnesium sulfate. Evaporation of the benzene left 5.48 g. of 2'-O-acetyl-4"-O-formyl-10,11 anhydroerythromycin B as an orange foam.

A solution of 10.7 g. of 2'-O-acetyl-4"-O-formyl-10,11-anhydroerythromycin B in 260 ml. of methanol was allowed to stand at room temperature for three days. The solution was treated with Darco G-60 and filtered through a Celite mat. The major portion of the methanol was evaporated under reduced pressure and the residue was shaken with a mixture of 600 ml. of chloroform and 400 ml. of 5% $NaHCO_3$. The chloroform solution was washed with three 300-ml. portions of water, and dried over anhydrous magnesium sulfate. Evaporation of the chloroform left 9.1 g. of a white foam. This product (5.1 g.)

was chromatographed on a Sephadex LH-20 column with methanol to yield 3.74 g. of a white foam. Crystallization of this material from ether gave 2.42 of pure 10,11-anhydroerythromycin B, m.p. 118–130°, $[\alpha]_D^{24}$ —51°; $\lambda_{max.}$ 232 nm. ($\epsilon$ 10,639); IR: 3610, 3575–3400, 1725, 1667 cm.$^{-1}$; NMR: $\delta$ 6.42 ($C_{11}$-H), 3.32 (OCH$_3$), 2.30 (NMe$_2$), 1.77 ($C_{10}$-CH$_3$).

*Anal.*—Calcd. for $C_{37}H_{65}O_{11}N$: C, 63.49; H, 9.36; N, 2.00. Found: C, 63.40; H, 9.63; N, 1.92.

EXAMPLE 2

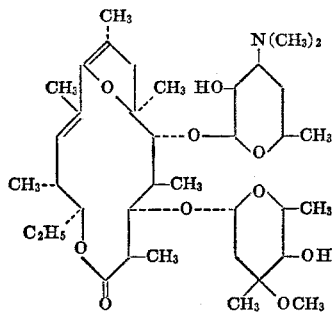

10,11-Anhydroerythromycin B Enol Ether

A solution prepared from 2.1 g. of 10,11-anhydroerythromycin B in 25 ml. of glacial acetic acid was allowed to stand at room temperature for 4 hours. The major portion of the acetic acid was then evaporated under reduced pressure and a slurry prepared from 15 g. of solid NaHCO$_3$ and 150 ml. of water was added. The resulting mixture was extracted with 200 ml. of chloroform, and the chloroform solution was washed with three 120-ml. portions of water. The chloroform solution was dried over anhydrous magnesium sulfate. Evaporation of the chloroform left 2.0 g. of a white glass.

Partition column chromatography of 800 mg. of this product gave 726 mg. of the pure enol ether of 10,11- anhydroerythromycin B, $[\alpha]_D^{24}$=—94°; $\lambda_{max.}$ 262 nm. ($\epsilon$ 2864); IR: 3595, 3545, 3500–3400, 1723 cm.$^{-1}$; NMR: $\delta$ 5.12 ($C_{11}$-H), 3.33 (OCH$_3$), 2.29 (NMe$_2$), 1.66 ($C_{10}$-CH$_3$), 1.59 ($C_8$-CH$_3$), 1.47 ($C_6$-CH$_3$).

*Anal.*—Calcd. for $C_{37}H_{63}O_{10}N$: C, 65.17; H, 9.32; N, 2.06. Found: C, 64.92; H, 9.41; N, 1.99.

EXAMPLE 3

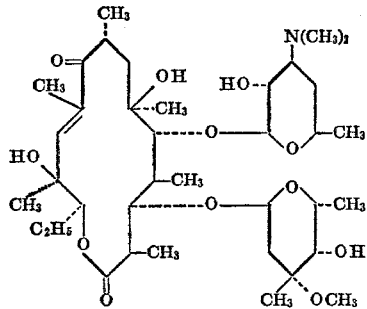

10,11-Anhydroerythromycin A

A solution prepared from 15.1 g. of 11-O-methanesulfonyl-2'-O-acetyl-4''-O-formylerythromycin A, 7.0 g. of 1,5 - diazabicyclo[5.4.0]undecene-5, and 102 ml. of benzene was heated under reflux for 0.5 hours. The reaction mixture was cooled to room temperature, and 100 ml. of benzene and 100 ml. of water was added. The resulting mixture was stirred at room temperature for 40 minutes and then shaken with a mixture of 500 ml. of benzene and 800 ml. of 5% NaHCO$_3$. The aqueous phase was separated and extracted with 700 ml. of benzene. The benzene solutions were washed in series with three 600 ml. portions of water, combined, and dried over anhydrous magnesium sulfate. Evaporation of the benzene left 12.0 g. of 2'-O-acetyl-4''-O-formyl-10,11-anhydroerythromycin A.

A solution of 12.0 g. of 2'-O-acetyl-4''-O-formyl-10,11-anhydroerythromycin A in 300 ml. of methanol was allowed to stand at room temperature for 50 hours. The major portion of the methanol was evaporated and the residue was shaken with a mixture of 800 ml. of chloroform and 600 ml. of 5% NaHCO$_3$. The chloroform solution was washed with three 600 ml. portions of water, and dried over anhydrous magnesium sulfate. Evaporation of the chloroform left 10.7 g. of a bright yellow glass. Partition column chromatography of this material (2.54 g.) gave 923 mg. of pure 10,11-anhydroerythromycin A as a white glass, $[\alpha]_D^{24}$ —58°; $\lambda_{max.}$ 233 nm. ($\epsilon$ 9479); IR: 3610–3350; 1727, 1665 cm.$^{-1}$; NMR: $\delta$ 6.48 ($C_{11}$-H), 3.32 (OCH$_3$), 2.28 (NMe$_2$), 2.02 ($C_{10}$-CH$_3$).

*Anal.*—Calcd. for $C_{37}H_{65}O_{12}N$: C, 62.08; H, 9.15; N, 1.96. Found: C, 61.88; H, 9.43; N, 1.94.

EXAMPLE 4

10,11-Anhydroerythromycin A

A mixture prepared from 912 mg. of 11,12-epoxyerythromycin A, prepared in accordance with the procedure set out in commonly assigned, copending application, filed as of even date, bearing Ser. No. 263,087, 533 mg. of 1,5-diazabicyclo[5.4.0]undecene-5, and 0.08 ml. of methanesulfonic acid, was heated under reflux for 3 hours. The resulting solution was cooled to room temperature, and 20 ml. of benzene and 10 ml. of water was added. The resulting mixture was stirred at room temperature for 90 minutes and then shaken with a mixture of 200 ml. of benzene and 200 ml. of benzene. The benzene solutions were washed in series with three 100-ml. portions of water, and combined. Evaporation of the benzene under reduced pressure left 687 mg. of an orange glass. Partition column chromatography of 623 mg. of this material gave 357 mg. of pure 10,11-anhydroerythromycin A which was identical with that prepared by the method 5.

EXAMPLE 5

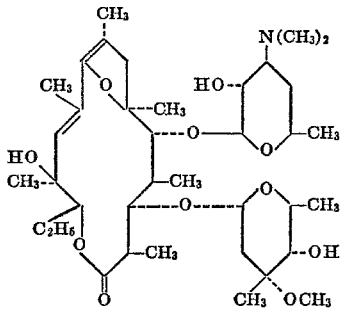

10,11-Anhydroerythromycin A Enol Ether 10,11-Anhydroerythromycin A (1.57 g.) was converted to 1.23 g. of 10,11-anhydroerythromycin A enol ether by the method of Example 2. Partition column chromatography of 1.2 g. of this product gave 288 mg. of pure 10,11-anhydroerythromycin A enol ether as a white glass, $[\alpha]_D^{26}$ —88°; $\lambda_{max.}$ 267 nm. ($\epsilon$ 2628): IR: 3605, 3554, 3500–3400, 1727 cm.$^{-1}$, NMR: $\delta$ 5.26 ($C_{11}$-H), 3.32 (OCH$_3$), 2.28 (NMe$_2$), 1.88 ($C_{11}$-OCH$_3$), 1.60 ($C_8$-CH$_3$), 1.46 ($C_6$-CH$_3$).

*Anal.*—Calcd. for $C_{37}H_{63}O_{11}N$: C, 63.68; H, 9.10; N, 2.01. Found: C, 63.56; H, 9.29; N, 1.94.

EXAMPLE 6

10,11-Anhydroerythromycin A Enol Ether

A solution prepared from 205 mg. of 11,12-epoxyerythromycin A, prepared as described in copending, commonly assigned application bearing Serial No. 263,087, filed as of even date, and 2.5 mg. of glacial acetic acid was allowed to stand at room temperature for 46 hours. The product, 162 mg. of a white glass, was isolated by the method of Example 5. Partition column chromatography gave 46 mg. of pure 10,11-anhydroerythromycin A, identical with that prepared by the method of Example 5.

EXAMPLE 7

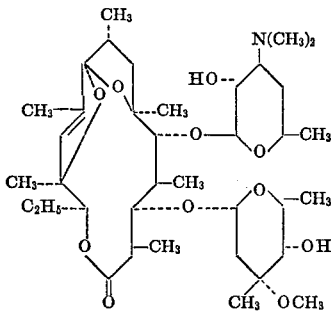

10,11-Anhydroerythromycin A 6,9:9,12-Spiroketal

A solution prepared from 300 mg. of 11,12-epoxyerythromycin A, and 3.8 ml. of glacial acetic acid was allowed to stand at room temperature for 48 hours. The product, 248 mg. of white glass was then isolated. Partition column chromatography gave 133 mg. of 10,11-anhydroerythromycin A enol ether, identical with that prepared by the method of Example 5, and 52 mg. of pure 10,11-anhydroerythromycin A, 6,9:9,12-epiroketal, IR: 3540, 3500–3400, 1722 cm.$^{-1}$; NMR δ 5.42 ($C_{11}$-11), 3.25 ($OCH_3$), 2.28 ($NMe_2$); 1.73 ($C_{10}$-$CH_3$), 1.59 ($C_6$-$CH_3$).

The compounds were then tested for their activity against gram-positive and gram-negative bacteria in an agar dilution test. Results are given in agar dilution units. These may be converted to MIC values (minimum inhibitory concentrations) expressed in micrograms/ml. by merely dividing the agar dilution units into the concentration and multplying by the proper factor. Thus, for example, if one tested a sample at a concentration of 4 mg./ml., and determined it had an activity of 10 agar dilution units, in order to determine the MIC value in micrograms/ml. one must divide the concentration of 4 by the number of agar dilution units, here 10, and multiply by 1000.

The compounds here were tested as to their activity against the following organisms:

$ECR_3$=Multiple drug resistant *Escherichia coli*
SF=*Streptococcus faecalis* ATCC 10541
PA=*Pseudomonas aeruginosa* BMH # 1
SA=*Staphylococcus aureus* ATCC 6438P
EC=*Escherichia coli* ATCC 26
BS=*Bacillus subtilis* #10707 (University of Ill.)
PV=*Proteus vulgaris* ATCC 6897
SS=*Shigella sonnei* ATCC 9290
ST=*Salmonella typhosa* ATCC 9992
KP=*Klebsiella pneumoniae* ATCC 10031.

Results are as follows:

TABLE I

| | $ECR_3$ | SF | PA | SA | EC | BS | PV | SS | ST | KP |
|---|---|---|---|---|---|---|---|---|---|---|
| Example 1: 4 mg./ml.. | 10 | 2,500 | 0 | 1,280 | 0 | 2,500 | 0 | 0 | → | 80 |
| | 20 | | 10 | 2,500 | | | | 10 | | 320 |
| 4 mg./ml.. | 0 | 2,500 | 0 | 1,280 | 0 | 2,500 | 0 | | 0 | 80 |
| | 10 | 5,000 | 10 | 2,500 | | 5,000 | → | | 10 | 320 |

TABLE II

| | $ECR_2$ | SF | PA | SA | EC | BS | PV | SS | ST | KP |
|---|---|---|---|---|---|---|---|---|---|---|
| Example 2: 1 mg./ml.. | 0 | 80 | 0 | 40 | 0 | 40 | 0 | | | 0 |
| | | 160 | | 80 | | 80 | → | | | 10 |

TABLE III

| | $ECR_3$ | SF | PA | SA | EC | BS | PV | SS | ST | KP |
|---|---|---|---|---|---|---|---|---|---|---|
| Example 3: 1 mg./ml.. | 0 | 80 | 0 | 40 | 0 | 40 | 0 | | | 10 |
| | | 160 | | 80 | | | | | | 20 |

TABLE IV

| | $ECR_3$ | SF | PA | SA | EC | BS | PV | SS | ST | KP |
|---|---|---|---|---|---|---|---|---|---|---|
| Example 5: 4 mg./ml.. | 10 | 5,000 | 0 | 2,500 | 0 | 5,000 | 0 | 0 | 10 | 80 |
| | | | 10 | | 10 | | 0 | 10 | 20 | 320 |
| 3 mg./ml.. | 0 | 1,280 | 0 | 320 | 0 | 1,280 | 0 | | | 80 |
| | 10 | 2,500 | 10 | 1,280 | | 2,500 | → | | | 320 |

TABLE V

| | $ECR_3$ | SF | PA | SA | EC | BS | PV | SS | ST | KP |
|---|---|---|---|---|---|---|---|---|---|---|
| Example 7: 1 mg./ml.. | 0 | 10 | 0 | 0 | 0 | 10 | 0 | 0 | 0 | 0 |

The compounds were also tested against a variety of other gram negative and gram positive bacteria. Results of antibiotic activity are as follows. Figures are MIC values in terms of mcg./ml. Erythromycin A was used as a standard.

TABLE VI

| Organism | Erythromycin base | Example 1 | Example 2 | Example 5 |
|---|---|---|---|---|
| *Staphylococcus aureus* 9144 | 0.2 | 6.2 | 25 | 6.2 |
| *Staphylococcus aureus* Smith | 0.2 | 6.2 | 25 | 6.2 |
| *Staphylococcus aureus* Smith ER | >100 | >100 | 100 | >100 |
| *Staphylococcus aureus* Wise 155 | >100 | >100 | 50 | >100 |
| *Streptococcus faecalis* 10541 | 0.05 | 1.6 | 3.1 | 1.6 |
| *Escherichia coli* Jun 1 | 50 | >100 | >100 | >100 |
| *Klebsiella pneumoniae* 10031 | 3.1 | 25 | 100 | 12 |
| *Proteus vulgaris* Abbott JJ | >100 | >100 | >100 | >100 |
| *Proteus mirabilis* Finland #9 | >100 | >100 | >100 | >100 |
| *Salmonella typhimurium* Ed #9 | 25 | >100 | >100 | >100 |
| *Shigella sonnei* 9290 | 12 | >100 | >100 | >100 |
| *Pseudomonas aeruginosa* BMH #10 | 50 | >100 | >100 | >100 |
| *Streptococcus pyogenes* Roper | | | | |
| *Staphylococcus aureus* Quinoes | >100 | >100 | 100 | >100 |
| *Streptococcus pyogenes* RO | >100 | >100 | 50 | >100 |
| *Streptococcus pyogenes* Scott | >100 | >100 | 50 | >100 |
| *Mycobacterium gallisepticum* S6 | 0.2 | 100 | 5 | 0.5 |
| *Mycobacterium granularum* 19168 | 0.5 | 100 | 100 | 0.2 |
| *Mycobacterium hyorhinis* 17981 | 25 | 100 | 100 | 50 |
| *Mycobacterium pneumoniae* FH | 0.2 | 100 | 2.5 | .25 |
| *Haemophilus influenzae* Patterson | 1.56 | 100 | 100 | 50 |
| *Haemophilus influenzae* Brimm CSF | 0.78 | 100 | >100 | 25 |
| *Haemophilus influenzae* Shemwell | 1.56 | 100 | >100 | 50 |
| *Haemophilus influenzae* Illinois | 3.1 | 100 | >100 | 50 |
| *Haemophilus influenzae* Terry | 1.56 | 100 | >100 | 50 |
| *Crithidia fascicalata* | 100 | >100 | 100 | >100 |
| *Trichomonas vaginalis* CLMI | 100 | >100 | 100 | >100 |
| *Haemophilus influenzae* 9334 | 3.1 | 100 | >100 | 50 |

What is claimed is:
1. An erythromycin derivative selected from the group consisting of 10,11-anhydroerythromycin B, 10,11-anhydroerythromycin B 6,9 enol ether, 10,11-anhydroerythromycin A 6,9 enol ether, 10,11-anhydroerythromycin A and 10,11-erythromycin A 6,9:9,12-spiroketal.

2. The derivative of Claim 1 which is 10,11-anhydroerythromycin B.

3. The derivative of Claim 1 which is 10,11-anhydroerythromycin B 6,9 enol ether.

4. The derivative of Claim 1 which is 10,11-anhydroerythromycin A 6,9 enol ether.

5. The derivative of Claim 1 which is 10,11-anhydroerythromycin A.

6. The derivative of Claim 1 which is 10,11-anhydroerythromycin A 6,9:9,12-spiroketal.

References Cited
UNITED STATES PATENTS 3,681,323   8/1972   Kurath et al.   260—210 E JOHNNIE R. BROWN, Primary Examiner C. B. OWENS, Assistant Examiner U.S. Cl. X.R.

424—182

UNITED STATES PATENT OFFICE
CERTIFICATE OF CORRECTION

Patent No. 3,828,022        Dated August 6, 1974

Inventor(s) John Soloman Tadanier and Jerry Roy Martin

It is certified that error appears in the above-identified patent and that said Letters Patent are hereby corrected as shown below:

In Column 1, delete the formula:

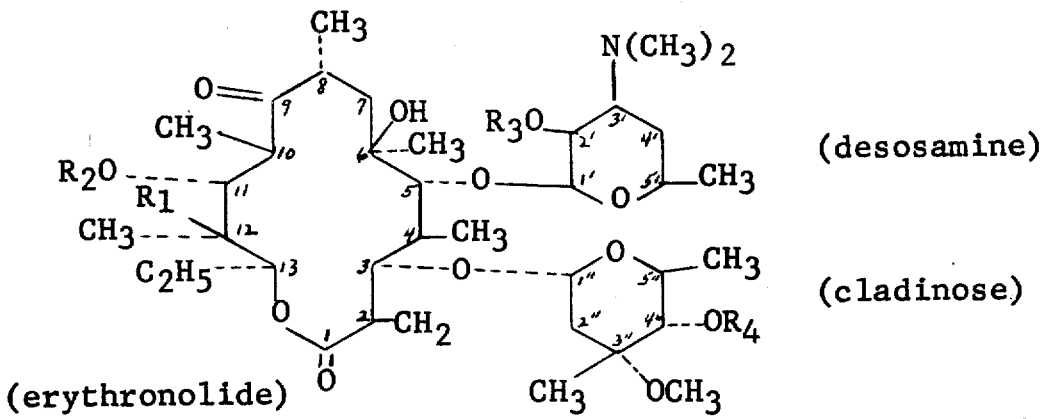

and substitute therefor:

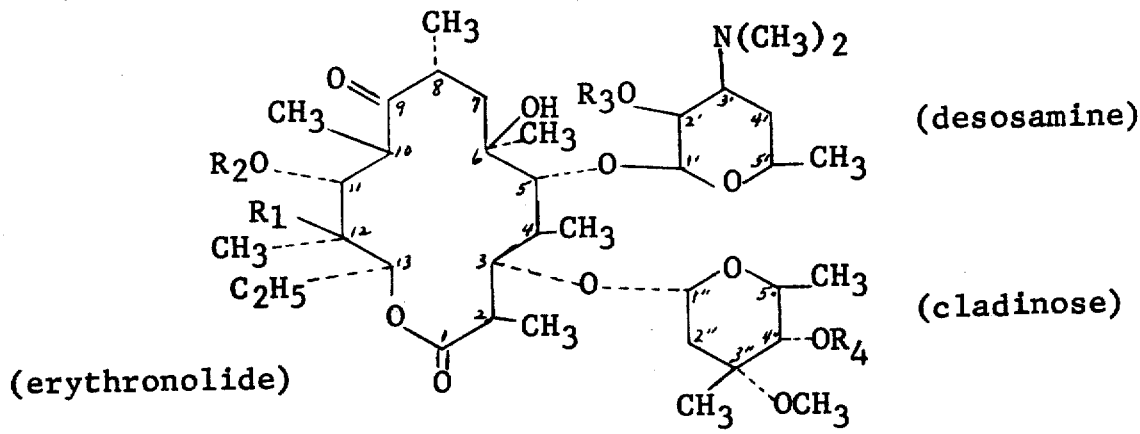

Signed and sealed this 26th day of November 1974.

(SEAL)
Attest:

McCOY M. GIBSON JR.
Attesting Officer

C. MARSHALL DANN
Commissioner of Patents